United States Patent [19]

Raue

[11] 4,187,987

[45] Feb. 12, 1980

[54] FUEL INJECTOR

[75] Inventor: Reimund Raue, Cologne, Fed. Rep. of Germany

[73] Assignee: Klockner-Humboldt-Deutz Aktiengesellschaft, Cologne, Fed. Rep. of Germany

[21] Appl. No.: 956,095

[22] Filed: Oct. 30, 1978

[30] Foreign Application Priority Data

Nov. 17, 1977 [DE] Fed. Rep. of Germany ....... 2751358

[51] Int. Cl.[2] ...................... F02M 51/06; F16K 31/06

[52] U.S. Cl. ..................................... 239/585; 251/129

[58] Field of Search ......................... 239/533.2–533.12, 239/585; 251/129, 130, 139, 140; 123/32 AE, 32 AB, 32 JV, 139 E

[56] References Cited

U.S. PATENT DOCUMENTS

| | | | |
|---|---|---|---|
| 2,356,134 | 8/1944 | Voit | 239/585 |
| 3,830,433 | 8/1974 | Miyake | 239/585 X |

*Primary Examiner*—Joseph E. Valenza
*Assistant Examiner*—Andres Kashnikow
*Attorney, Agent, or Firm*—Becker & Becker, Inc.

[57] ABSTRACT

A fuel injector for internal combustion engines, comprising a controllable fuel injection pump and a fuel injection valve. The valve has a spring-loaded valve needle which opens counter to the direction of flow of fuel, and which is acted upon by an additional closing force during closure of the needle. The armature of a lifting magnet acts upon that end of the valve needle which faces the spring, and acts in the direction of closure and parallel to the valve spring.

2 Claims, 1 Drawing Figure

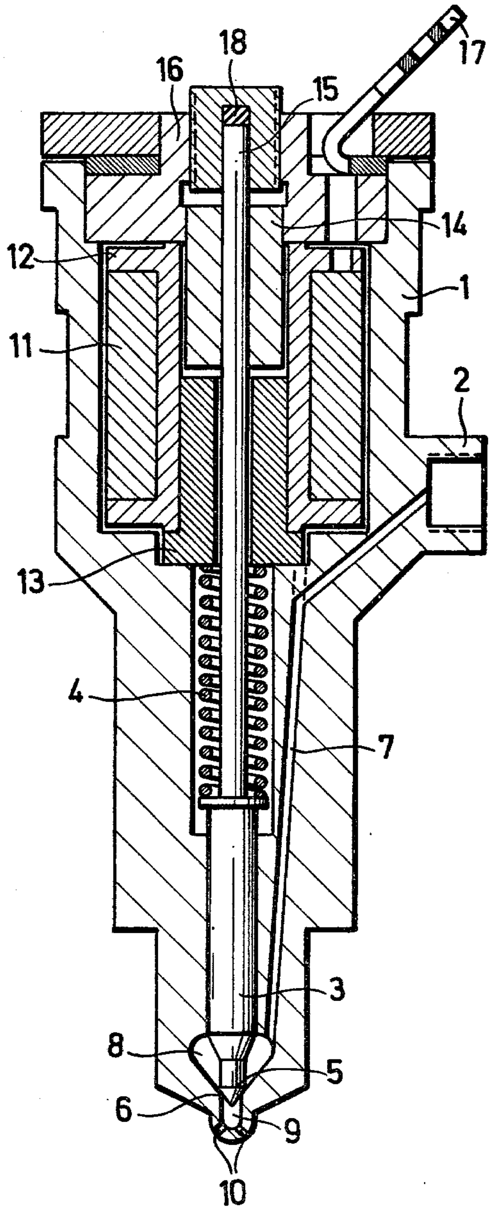
18
16
15
17
14
12
1
11
2
13
4
7
3
8
5
6
9
10

FUEL INJECTOR

The present invention relates to a fuel injector for internal combustion engines, and comprises a controllable fuel injection pump and a fuel injection valve, which has a spring-loaded valve needle which opens counter to the direction of flow of the fuel, and which is acted upon by an additional closing force during closing.

With known fuel injectors of the above mentioned general type, the valve needle, on that end thereof which faces the spring, is acted upon by fuel from a fine choke bore which branches off from a main fuel line of the injection valve. By means of the choke bore, a phase displacement between the pressure build-up on the needle side and the pressure build-up on the spring side occurs, so that an increased closure pressure occurs only after the valve needle has opened. The release of fuel pressure on that end of the valve needle which faces the spring is effected by a second choke bore, which establishes a connection to an overflow-oil line. The increase of the closure pressure is intended to accelerate the closing of the nozzle needle at the conclusion of the injection, as well as to prevent a post-injection. The build-up and release of the additional closure pressure are extensively dependent upon the hydraulically determined values of the choke bore as well as on the speed and load dependent relationships in the main fuel line, and can therefore not be optimally synchronized to the operating conditions of the internal combustion engine. Furthermore, it is a drawback that the pressure build-up in the injection system on the nozzle side is reduced by branching off some of the fuel in order to have pressure act upon the nozzle needle. This situation is particularly disadvantageous if the highest injection pressures are to be achieved with given parameters on the pump side. In addition, the amount of fuel injected is affected by the removal of fuel from the main line; in other words, a major quantity of fuel is dispersed from element to element.

It is therefore an object of the present invention to provide a fuel injector for high pressure injection, according to which the increase in closure pressure is independent of the hydraulic system of the fuel injector, and according to which the fuel injector, by simple means, is controllable as a function of suitable operating parameters of the internal combustion engine.

This object, and other objects and advantages of the present invention, will appear more clearly from the following specification in connection with the accompanying drawing, which shows a longitudinal section through a fuel injection valve of the fuel injector of the present invention.

The fuel injector of the present invention is characterized primarily in that the armature of a lifting magnet acts upon that end of the valve needle which faces the spring, and operates in the closing direction parallel to the valve spring.

By arranging a lifting magnet in accordance with the present invention, the additional closing force can easily be controlled by any desired operating parameter. In so doing, the lifting magnet can be kept relatively small, since it only needs to furnish a portion of the closing force, and the accelerating forces for this usage are relatively small.

Although electromagnetically actuated fuel injection valves for internal combustion engines are known, the opening of the valve needles, which open in the direction of flow, is brought about by lifting magnets. Difficulties arise with such fuel injection valves due to the high pressures and accelerating forces which occur during the short opening process. This heretofore known arrangement is in contrast with the present invention, where lifting magnets are only used during the closing operation.

The drawing is an axial sectional view of the fuel injection nozzle according to the invention. Referring now to the drawing in detail, an axially displaceable valve needle 3 is located in a valve housing 1 having a fuel line connection 2. The valve needle 3 is loaded in the direction of closing by a valve spring 4. The tip 5 of the valve needle 3 controls the fuel flow at the valve seat 6. The valve needle 3 opens counter to the direction of flow of the fuel as soon as the pressure in the pressure chamber 8 overcomes the force of the valve spring 4. The fuel is supplied to the pressure chamber 8 from the fuel line connection 2 through a fuel line 7. A blind hole 9 is joined to the valve seat 6 in the direction of flow of the fuel. Spray holes 10 start at the blind hole 9.

Parallel to the valve spring 4, that end of the valve needle 3 which faces the spring is acted upon by a lifting magnet during the closing process. The lifting magnet is located in the upper part of the valve housing 1, and essentially comprises an exciting coil or operating winding 11, an electromagnetic body 12, and a magnet core 13. The valve spring 4 is braced against an end face of the magnet core 13. An armature 14 is axially displaceably mounted in a cover 16 of the housing 1 by a tie bolt 15. During the closing process, that end of the tie bolt 5 which faces the spring rests against the valve needle 3. A special return spring for the armature 14 is not necessary, since the valve needle 3, under the influence of the fuel pressure, returns the armature 14 to the starting position by means of the tie bolt 15. However, for noise reasons, it may be advantageous to provide an elastic, damped stop 18 for the armature 14. The supply of current to the electromagnet is effected by the terminal 17.

When the valve needle 3 is being opened, no voltage is applied to the operating winding 11. Therefore, the valve needle 3 opens in a reliable manner with an opening pressure determined by the valve spring 4. When the fuel pressure falls off, the valve needle 3 is moved in the closing direction by the spring 4. Shortly before, or at any desired point during the closing process, the electromagnet is energized and, with its tie bolt 15, exerts an additional closing force on the valve needle 3. The magnitude of the closing force, as well as the point in time, can be optimally synchronized to the respective operating conditions of the internal combustion engine by means of known electrical control devices.

The present invention is, of course, in no way restricted to the disclosure of the drawing, but also encompasses any modifications within the scope of the appended claims.

What I claim is:

1. A fuel injector for internal combustion engines and comprising a controllable fuel injection pump and a fuel injection valve which includes:
   - a valve housing containing spray holes;
   - a valve spring mounted in said valve housing;
   - a valve needle axially displaceably mounted in said valve housing on one end of said valve spring in such a way as to open against the force of said valve spring in response to build-up of fuel pressure to allow fuel to pass through said spray holes, and in such a way as to close by the force of said spring in response to release of fuel pressure to prevent fuel from passing through said spray holes;

a lifting magnet comprising an armature and a tie bolt and mounted in said valve housing parallel to said valve spring in such a way as to act upon the spring side of said valve needle to work with said valve spring in the closure of said valve needle.

2. A fuel injector according to claim 1, which includes a damped, elastic stop mounted in said valve housing to quiet said tie bolt.

* * * * *